(12) United States Patent
Fan et al.

(10) Patent No.: US 9,719,826 B2
(45) Date of Patent: Aug. 1, 2017

(54) MASS FLOW PRIMARY WITH EXCITER

(71) Applicant: Honeywell International Inc., Morristown, NJ (US)

(72) Inventors: Xianyong Fan, Shanghai (CN); Chuang Huang, Shanghai (CN); Guokun Song, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/824,245

(22) Filed: Aug. 12, 2015

(65) Prior Publication Data
US 2017/0045388 A1    Feb. 16, 2017

(51) Int. Cl.
*G01F 1/84* (2006.01)

(52) U.S. Cl.
CPC .................. *G01F 1/8477* (2013.01)

(58) Field of Classification Search
CPC .... G01F 1/84; G01F 1/58; G01F 1/00; G01V 3/00
USPC ........ 73/861.355–861.357, 861.12; 324/306; 702/45
See application file for complete search history.

(56) References Cited

U.S. PATENT DOCUMENTS

| | | | |
|---|---|---|---|
| 4,487,062 A | 12/1984 | Olin et al. | |
| 4,680,974 A | 7/1987 | Simonsen et al. | |
| 4,768,384 A | 9/1988 | Flecken et al. | |
| 4,801,897 A | 1/1989 | Flecken | |
| 4,959,990 A | 10/1990 | Morris | |
| 5,069,075 A | 12/1991 | Hansen et al. | |
| 5,233,868 A | 8/1993 | Coats et al. | |
| 5,337,616 A * | 8/1994 | Lew | G01F 1/8413 73/861.355 |
| 5,637,804 A | 6/1997 | Hansen | |
| 5,728,952 A * | 3/1998 | Yao | G01F 1/8418 73/32 A |
| 5,763,791 A | 6/1998 | Shambayati | |
| 6,758,103 B2 | 7/2004 | Hansen | |
| 7,216,550 B2 | 5/2007 | Lesjak et al. | |
| 7,228,749 B2 | 6/2007 | Kassubek et al. | |
| 7,265,544 B2 * | 9/2007 | Keese | G01F 1/60 324/306 |
| 7,640,813 B2 | 1/2010 | Storm | |
| 8,359,933 B2 * | 1/2013 | Drahm | G01F 1/8431 73/861.357 |

(Continued)

OTHER PUBLICATIONS

PCT International Search Report for PCT/US2016/045232 dated Nov. 10, 2016.

*Primary Examiner* — Jewel V Thompson
(74) *Attorney, Agent, or Firm* — Kevin Soules; Luis M. Ortiz; Kermit D. Lopez

(57) ABSTRACT

A method, system, and apparatus for measuring mass flow comprises two tubes for transporting a material; two exciters wherein one of the two exciters is fixedly attached on each of the two tubes configured to induce a vibration in the two tubes; at least two sensors on each of the tubes; a test media flowing through the tube, wherein a phase difference in the tubes is indicative of a mass flow of the test media; and a comparer module operably connected to the at least two sensors on each of the tubes for determining a phase difference of the vibrations in the tubes and determining a mass flow according to the phase difference.

20 Claims, 4 Drawing Sheets

(56) References Cited

U.S. PATENT DOCUMENTS

| | | | |
|---|---|---|---|
| 8,596,144 B2* | 12/2013 | Rieder | G01F 1/8418 |
| | | | 73/861.55 |
| 8,931,354 B2 | 1/2015 | Ricken et al. | |
| 2003/0089180 A1 | 5/2003 | Amabili et al. | |
| 2011/0023624 A1* | 2/2011 | Huber | G01F 1/8409 |
| | | | 73/861.357 |

* cited by examiner

MASS FLOW PRIMARY WITH EXCITER

FIELD OF THE INVENTION

The present invention is generally related to methods, systems, and apparatuses for a primary associated with mass flow meters for measuring mass flow.

BACKGROUND

There are numerous applications that require measurement of flow. Increasingly, mass flow meters are necessary. Prior art flow meters are generally formed with a frame that is fixed on a pipe and a coil that is fixed on an adjacent pipe.

Differing from traditional flow metering principles, which use flow velocity or flow volume measurements to derive the flow rate, a Coriolis mass flow meter measures the mass flow rate of the product directly. Mass is the only physical parameter which is independent of the other physical properties including pressure, viscosity, density, and Reynolds Number.

In prior art designs, there are many different designs including U-shaped, C-shaped, and Z-shaped test primaries. However, all of these structures can unnecessarily result in large pressure drop. If a single tube test primary is used, it can cause vibration when fluid is inside the device and therefore requires some specialized parts to balance the vibration. Such parts are expensive and unnecessarily complicate the device. Therefore, there is a need in the art for a mass flow meter primary with better performance that can be adjusted to fit and match specific design requirements.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for measuring quantities.

It is another aspect of the disclosed embodiments to provide a method and system for measuring mass flow.

It is yet another aspect of the disclosed embodiments to provide an enhanced method, system, and apparatus for a mass flow meter primary for measuring mass flow.

The aforementioned aspects and other objectives and advantages can now be achieved as described herein. The primary is a key component of a mass flow meter which is used to test flow. The primary is designed based on Coriolis principle. Mass flow meters can be used in different fields including the chemical, petroleum, and food industries. In embodiments disclosed herein, a dual straight tube mass flow meter is disclosed which provides advantages over prior art inventions in flow measurement. The embodiments herein do not affect fluid temperature, pressure, density, viscosity, and so on. Thus, the flow is also not effected by the embodiments disclosed herein.

In one embodiment, a method, system, or apparatus comprises two tubes for transporting a material; two exciters wherein one of the two exciters is fixedly attached on each of the two tubes configured to induce a vibration in the two tubes; at least two sensors on each of the tubes; a test media flowing through the tube, wherein a phase difference in the tubes is indicative of a mass flow of the test media; and a comparer module operably connected to the at least two sensors on each of the tubes for determining a phase difference of the vibrations in the tubes and determining a mass flow according to the phase difference.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 4:
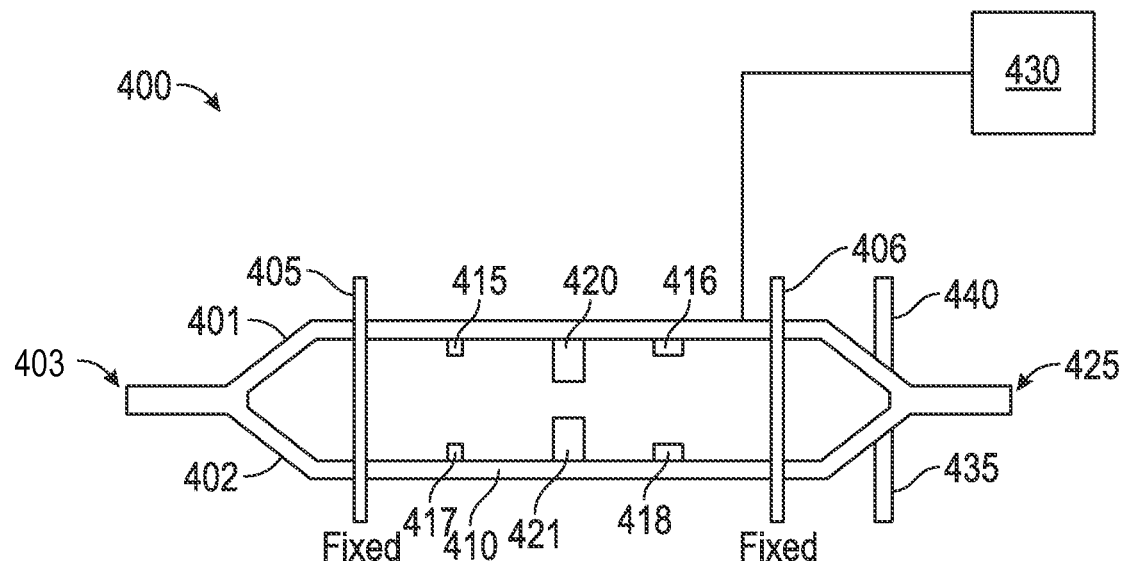
FIG. 4 depicts a block diagram of a system for measuring mass flow, in accordance with another embodiment of the invention.

In one embodiment illustrated in FIG. 4, a system 400 comprises a double tube design comprising tube 401 and 402 that can be driven at resonance frequency. The specific resonance frequency is determined by the density of the medium 410 flowing through, and closed in, the tubes 401 and 402. Fixed plates 405 and 406 are formed at both ends of the dual tube design. Signals for a set of sensors 415, 416, 417, and 418 can be collected and measured by a converter. Alternatively, the signals can be transmitted to a computing device for measurement and recording. The temperature of the test media flowing in the tubes 401 and 402 can be measured directly by temperature sensors 435 and 440 and can be used to compensate for the effects of varying temperatures of the test media 410.

Figure 1:
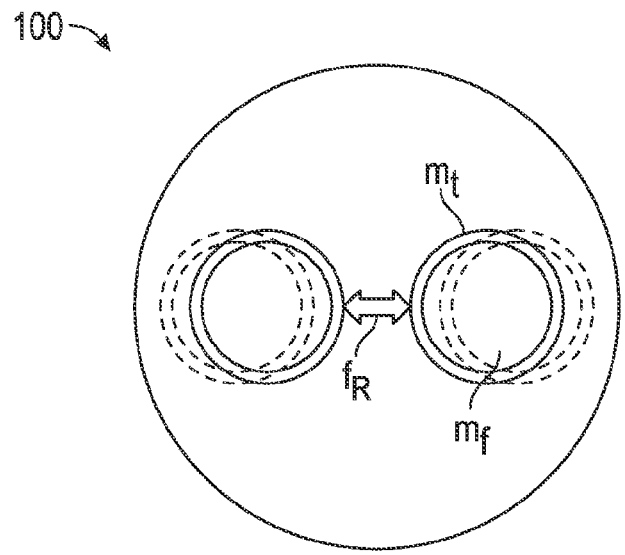
FIG. 1 depicts a block diagram of a vibrating tube section, in accordance with the disclosed embodiments.

In order for best operation, the vibration of tubes 401 and 402 should be induced by exciters 420 and 421, respectively, at the natural frequency of the tubes 401 and 402. Because this is generally a high frequency, exciters 420 and 421 drive the tubes at a frequency closest to the natural frequency in order to cause resonance. Preferably, the frequency of the exciters 420 and 421 is 50~60 Hz, which is required for many industrial applications. However, other frequencies may optionally be selected according to design consideration. A specially configured exciter may also be used to drive the dual tube primary vibration under its natural frequency. FIG. 1 illustrates the physical phenomenon associated with the calculation of the resonance frequency $F_r$. In particular, FIG. 1 illustrates the cross-section of tubes vibrating as indicated by an arrow. The resonant frequency of the vibrations shown in FIG. 1 is given by equation (1):

$$F_r = (1/2\pi)(c/(m_{fl}+m_t))^{1/2} \quad (1)$$

where $m_{fl}$ is the mass of the medium, $m_t$ is the mass of the measuring tube, and C is a constant.

Figure 2:
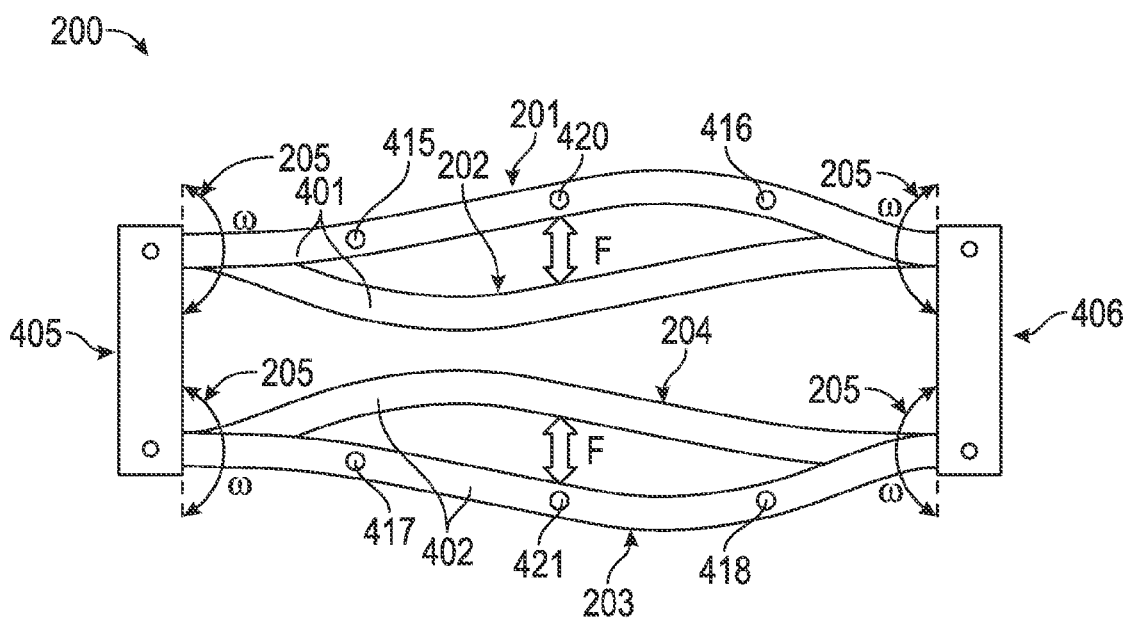
FIG. 2 depicts a graphical representation of the vibration of tubes, in accordance with the disclosed embodiments.

FIG. 2 illustrates the dual tube design 200 of a mass flow primary, in accordance with embodiments of the invention. In particular, FIG. 2 illustrates an exaggerated view of the vibration of the dual tubes shown in FIG. 4. FIG. 2 illustrates the position of each of tubes 401 and 402 at two separate points in time. Specifically, tube 401 is shown at position 201 and then at position 202 where position 202 is some amount of time after position 201. Similarly, tube 402 is shown at position 203 and then at position 204 some amount of time after position 203.

Position sensors 415 and 416 can be installed at positions A & B on tube 401. Similarly, position sensors 417 and 418 can be installed at positions A & B on tube 402. When there is no fluid in tubes, the exciters 420 and 421 induce equivalent vibrations in direction co as shown by 205 of both tubes. The exaggerated illustration of such vibration is shown in FIG. 2.

Once fluid is introduced into the tubes 401 and 402, a phase difference between their vibrations is created. Position sensors 415, 416, 417, and 418 can be used to determine the phase difference in the tubes 401 and 402 according to the locations of points A and B on tubes 401 and 402 collected by the position sensors 415, 416, 417, and 418. Once the phase difference is determined, it can be converted into a measurement of mass flow.

Figure 3:
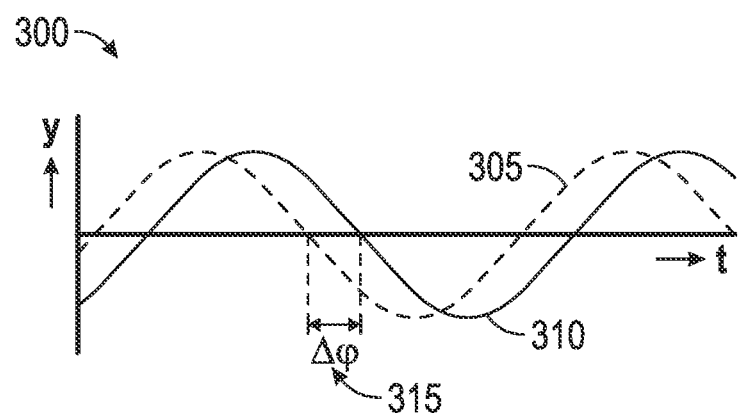
FIG. 3 depicts a graph illustrating sensor positions as a function of time, in accordance with an embodiment of the invention.

FIG. 3 further illustrates a representation 300 of the signal phase difference between positions A and B as illustrated in FIG. 2 for one of tubes 401 or 402. Trace 305 shows the position of, for example, position sensor 415 as a function of time and trace 310 shows the position of, for example, position sensor 416 as a function of time. It should be appreciated that this graphic is illustrative and could be equivalently indicative of the position sensors 417 and 418. The phase difference between points A and B is given by the quantity $\Delta\phi$ 315. The quantity 315 can be used, as is known in the art, to determine mass flow.

Figure 7:
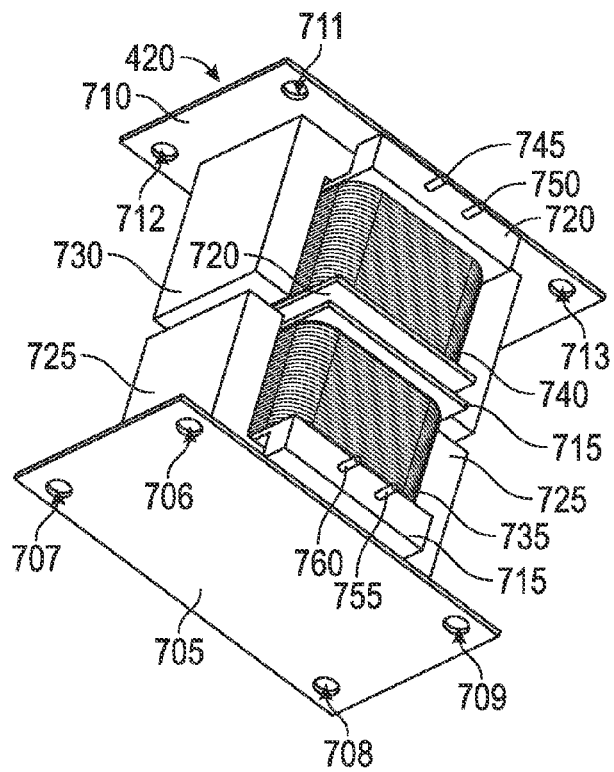
FIG. 7 depicts an exemplary dual E-shaped exciter, in accordance with another embodiment of the invention.

It should be understood that tubes 401 and 402 are driven, respectively, by exciters 420 and 421. In one embodiment, exciters 420 and 421 may comprise two "E" shaped multi-layer electromagnets installed in the dual tube mass flow meter primary 400 face to face. FIG. 7 illustrates an E-shaped dual exciter in accordance with embodiments of the invention. The E-shaped dual exciters 420 and 421 include two installation bases 705 and 710, one for each of the two exciters 420 and 421. The installation bases are formed with mounting holes. Installation base 710 includes mounting holes 711, 712, 713, and a fourth mounting hole (not shown) configured on the corners of installation base 710. Likewise, installation base 705 includes mounting holes 706, 707, 708, and 709 on its corners. Installation bases 705 and 710 are configured to be mounted to a tube such as tubes 401 and 402. The mounting holes can be used to hold the installation base to the tube or to another structure if necessary. The mounting holes can be configured to accept rivets, screws, nails, bolts, or other such connecting means.

The installation base 705 is rigidly fastened to plate 725. Installation base 710 is also rigidly fastened to plate 730. Plate 730 is arranged to be in communication with bone 720. The arrangement allows the bone to move along a prong of the E-shaped plate 730. Similarly, E-shaped plate 725 is arranged in communication with bone 715 in order to allow bone 715 to move along a prong of E-shaped plate 725.

Movement of bones 715 and 720 is induced by electromagnets 735 and 740, respectively. Bone 720 includes current inlet pin 745 and current outlet pin 750. Inlet pin 745 and outlet pin 750 provides electrical connection between electromagnet 740 and a power source. Similarly, bone 715 includes a current inlet pin 755 and current outlet pin 760. It should be appreciated that the power source may provide power to each electromagnet or separate power sources may be independently used to provide power to each electromagnet depending on design considerations.

The exciters 420 and 421 drive the respective tubes' vibration at a natural frequency. In order to determine the vibration signal, position sensors 415 and 416 associated with tube 401 and position sensors 417 and 418 associated with tube 402 can be symmetrically installed on the respective tubes. The test media (i.e., fluid) is input from flow inlet 403 and output from flow outlet 425.

When there is no fluid in the tubes 401 and 402 and the exciters 420 and 421 are vibrating the tubes, the respective signals from the symmetrically located position sensors are the same. When fluid is introduced into the tubes, the signal from the symmetrically located position sensors is not the same; thus, there is a phase difference between the signals from the position sensors. This phase difference is a result of the Coriolis force in the tubes when fluid is flowing through them. The phase difference is related to the speed of media and the mass flow is determined from this phase difference.

A comparer module 430 can be provided signals from the position sensors 415, 416, 417, and 418. The comparer module 430 uses the phase difference from the position sensors 415, 416, 417, and 418 to determine the speed and/or mass flow of the test media flowing through the tubes 401 and 402. The comparer module 430 may be embodied as hardware or as non-transitory instruction media associated with a computing device. The computing device may be a computer, mobile computing device, mobile telephone, tablet device, or other such computing device. In one embodiment, the comparer module 430 may be embodied as a program product or computer module configured to execute a set of instructions according to an algorithm.

In one embodiment, a simulation of a single tube can be used to determine its natural frequency. This allows the initial input frequency for the tubes (actuated by the exciters) to be set as closely as possible to the natural frequency. When there is a fluid in tube, the change in the natural frequency as compared to when the tubes are empty is negligible. Thus, the simulation provides a measure of control for the vibration induced by the exciter.

Figure 5:
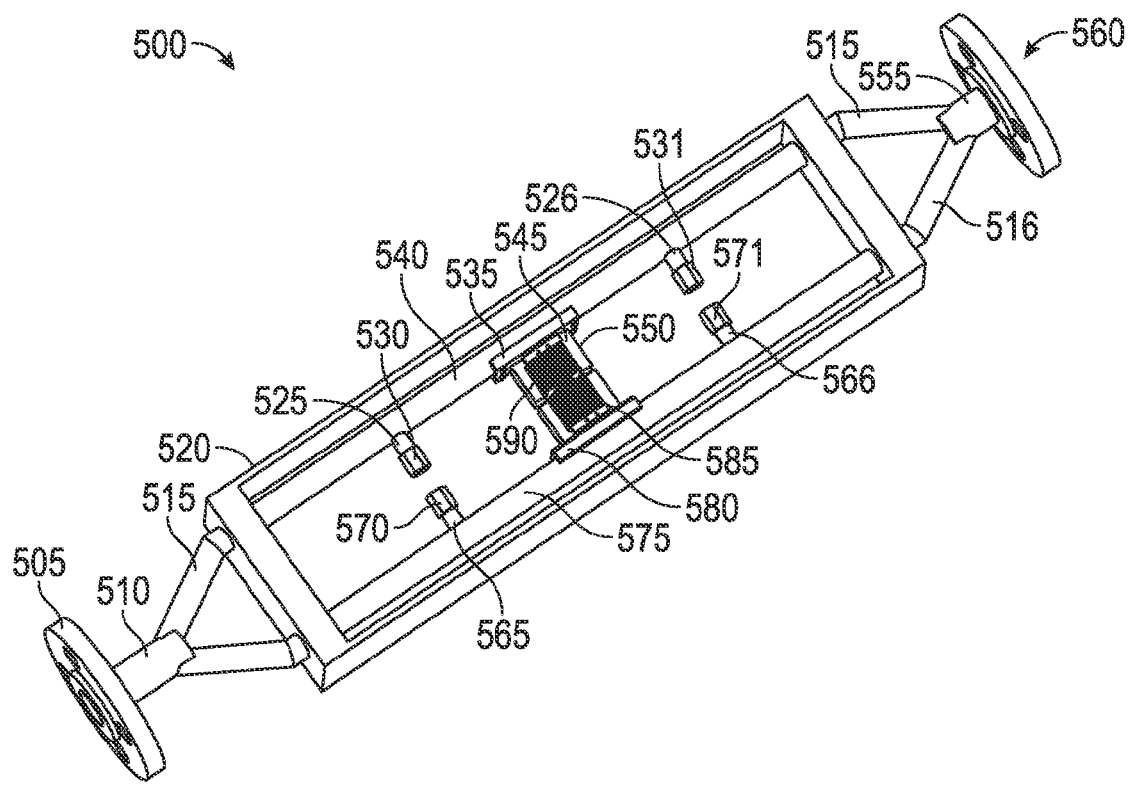
FIG. 5 depicts a block diagram of a system for measuring mass flow, in accordance with an embodiment of the invention.

FIG. 5 illustrates an exemplary embodiment of a dual tube mass flow primary 500. The dual tube mass flow primary includes a flange 505, with mounting holes, configured to allow the dual tube mass flow primary 500 to be mounted as desired. The flange 505 includes a hollowed center connected to a main tube 510, which allows operable connection to another tube so that test media can flow through the dual tube mass flow primary.

Figure 6:
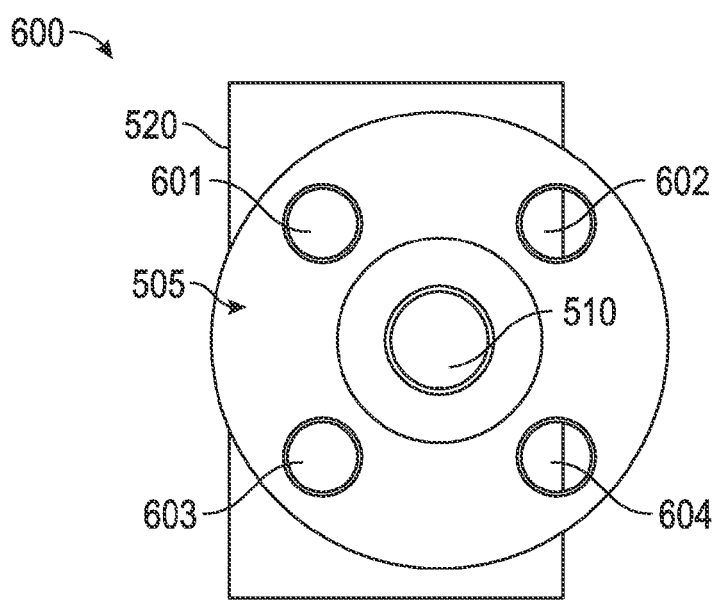
FIG. 6 depicts a block diagram of an elevation view of a system for measuring mass flow, in accordance with another embodiment of the invention.

FIG. 6 illustrates an elevation view 600 of the flange 505 and housing 520. The flange 505 includes a plurality of flange holes 601, 602, 603, and 604. It should be appreciated that any number of flange holes may be included in flange 505 depending on design considerations. It should further be appreciated that FIG. 6 could equivalently illustrate flange 560 with main tube 555.

The main tube 510 is then split via two outlets into the dual tube configuration which can be characterized by tube 515 and 516. A housing 520 may be provided to separate and hold the dual tube arrangement.

Focusing on tube 515, a position sensor base 525 may be connected to tube 515. The position sensor base 525 serves as a mounting point for a position sensor 530. The exciter 535 includes an exciter base 540 which serves to mount the exciter 535 to tube 515. The exciter 535 includes an electromagnetic coil assembly 545 and a silicon plate or base structure 550 that facilitates the mechanical vibration of the electromagnet. It should be appreciated that appropriate electrical connecting means may be provided in order to supply electricity to the electromagnet. Protection circuitry may also be provided to properly regulate the flow of electricity and induce vibration of the electromagnet at a desired and specified frequency.

A second position sensor base 526 and position sensor 531 are provided on tube 515 such that sensors 530 and 531 are located on opposing sides of the exciter 535. Tube 515 exits housing 520 and joins main tube 555 just before flange 560. Main tube 555 serves to join the dual tube mass flow primary in-line with a production environment, testing environment, or other such environment. Flange 560 can be configured to allow the dual tube mass flow primary 500 to be mounted as desired. It should be appreciated that the dual tube mass flow primary 500 may thus be inserted in-line in a production or testing environment such that test media flows into the dual tube mass flow primary from a production or testing environment via flange 505 and main tube 510 and exits dual tube mass flow primary 500 via main tube 555 and flange 560.

Turning to tube 516, the tube 516 enters housing 520. A position sensor base 565 and position sensor 570 are mounted on the tube 516.

An exciter 580 is mounted on tube 516. Exciter 580 includes an exciter base 575 which serves to mount the exciter 580 to tube 516. The exciter 580 includes an electromagnetic coil assembly 585 and a silicon plate or base structure 590 that facilitates the mechanical vibration of the electromagnet. It should be appreciated that appropriate electrical connecting means may be provided in order to supply electricity to the electromagnet. Protection circuitry may also be provided to properly regulate the flow of electricity and induce vibration of the electromagnet at a desired and specified frequency. This circuitry may be integrated with or independent of the circuitry associated with exciter 580.

A second position sensor base 566 and position sensor 571 are provided on tube 516 such that sensors 570 and 571 are located on opposing sides of the exciter 580. Tube 516 exits housing 520 and joins main tube 555 just before flange 560.

It should be appreciated that the embodiments described herein may provide tubes driven by an E-shaped exciter unit which can further comprise two identical electromagnets such that the vibration frequency on each tube is the same. Because the two electromagnets are separate, there is no mechanical contact between the two tubes. The frequency of vibration can be changed easily using an outside circuit. The dual electromagnets provide a solution for matching the natural frequency requirements of tubes, which have intrinsically different natural frequencies as a result of the manufacturing process. A multi-layer copper magnet with a protection circuit can be used to provide a strong magnetic field. The resulting magnetic forces can drive the tube's vibration easily. Finally, the dual tube structure is robust to pressure drop, unlike other known methods and systems making it easy to test different fluids including multi-phase fluids.

Figure 8:
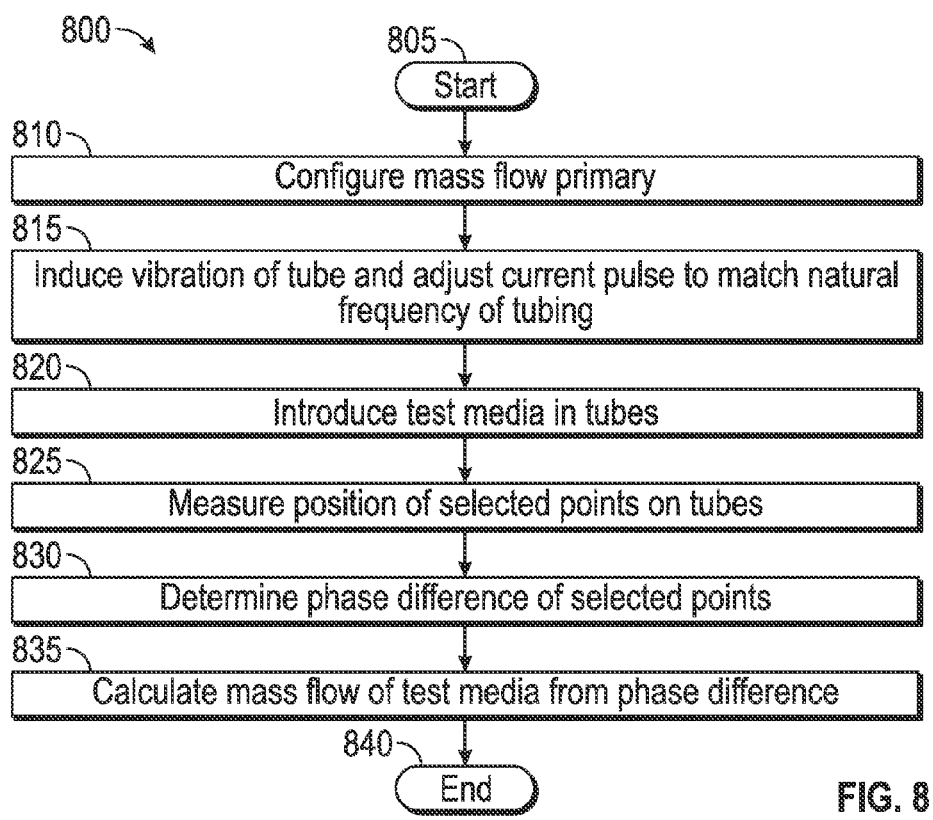
FIG. 8 depicts a flow chart of logical operational steps associated with a method, in accordance with another embodiment of the invention.

FIG. 8 illustrates a flow chart 800 of logical operational steps associated with measuring mass flow in accordance with embodiments of the invention. The method begins as indicated at block 805.

As depicted at block 810, a dual tube mass flow primary can be configured and assembled. Preferably, the dual tube mass flow primary is configured as illustrated in FIG. 5 and inserted in-line in a test or production workflow. As shown at block 815, exciters can be used to induce vibration of the tubes in the mass flow primary. The exciters are preferably electromagnetic and are driven by a current. The current pulses can be adjusted so that the induced vibration matches the natural frequency of the tubing.

Once the vibration at the natural frequency of the tubes has been induced, as illustrated at block 820, the test media can be introduced into the dual tube mass flow primary. Most commonly, this will comprise a liquid flowing through the tubing from an external production or testing environment. As the test media flows through the tubing, position sensors can be used to determine the position of selected points on the each tube in the dual tube mass flow primary, as shown at block 825. These measurements can be provided to a comparer module or other such computing system in order to determine the phase difference between the selected points, as described at block 830.

The phase difference is indicative of, and can be used to calculate, the mass flow of the test media flowing through the dual tube mass flow primary, as shown at block 835. The mass flow can be calculated and reported via the comparer module or other such computing system, which might include a display and/or other such user interface components. The method ends as indicated at block 840.

The method and systems describe herein describe a dual straight tube mass flow testing primary. Vibration of the tubes is preferably induced with dual E-shaped multi-layer magnets. The mass flow primary disclosed herein is easily adjustable to a natural frequency and has the advantage of relatively low power requirements. The current and frequency directing the vibration of the dual E-shaped exciters, and by extension, the dual tubes of the mass flow primary can be easily controlled using outside circuitry. In addition, the separate driving structure used in this invention helps to avoid the mechanical conflict which is common in prior art systems. The dual straight tube design has the advantage of being resilient to pressure changes in the testing environment. The dual E-shaped multi-layer exciter pair that is used to drive the vibration is driven by magnetic force. Thus, the electromagnet's weight can be controlled easily, which in turn allows the forces exerted by the magnets to be balanced which helps prevent vibration of the whole structure, as opposed to the individual tubes.

Based on the foregoing, it can be appreciated that a number of embodiments, preferred and alternative, are disclosed herein. For example, in one embodiment, a measuring system comprises two tubes for transporting a material; two exciters wherein one of the two exciters is fixedly attached on each of the two tubes configured to induce a vibration in the two tubes; at least two sensors on each of the tubes; and a test media flowing through the tube, wherein a phase difference in the tubes is indicative of a mass flow of the test media.

In another embodiment, the measuring system further comprises a comparer module operably connected to the at least two sensors on each of the tubes for determining a phase difference of the vibrations in the tubes and determining a mass flow according to the phase difference. The two exciters further comprise at least two electromagnets configured to induce vibration of the at least two tubes. The two exciters are configured to induce vibration of the at least two tubes at a natural frequency of the tubes when the test media is not present in the tubes.

In another embodiment, the measuring system further comprises a housing configured to rigidly hold the at least two tubes. The system can further comprise at least two temperature sensors configured to take a temperature of the test media flowing through each of the tubes. The system can further comprise an inlet allowing fluid from an environment to the at least two tubes and an outlet allowing fluid inside the at least two tubes to flow back into an environment.

In an alternative embodiment, an apparatus comprises two tubes for transporting a material; two exciters wherein one of the two exciters is fixedly attached on each of the two tubes configured to induce a vibration in the two tubes; at least two sensors on each of the tubes; a test media flowing through the tube, wherein a phase difference in the tubes is indicative of a mass flow of the test media; and a comparer module operably connected to the at least two sensors on each of the tubes for determining a phase difference of the vibrations in the tubes and determining a mass flow according to the phase difference.

In another embodiment, the two exciters further comprise at least two electromagnets configured to induce vibration of the at least two tubes. The two exciters are configured to induce vibration of the at least two tubes at a natural frequency of the tubes when the test media is not present in the tubes.

In another embodiment, the apparatus comprises a housing configured to rigidly hold the at least two tubes. The apparatus further comprises at least two temperature sensors configured to take a temperature of the test media flowing through each of the tubes. The apparatus also includes an inlet allowing fluid from an environment to flow into the at least two tubes and an outlet allowing fluid inside the at least two tubes to flow back into an environment.

In yet another embodiment, a method for measuring mass flow comprises inducing vibration in two tubes configured to transport a material; determining a position of at least two points on each of the at least two tubes with at least two sensors on each of the tubes; introducing a test media in the tubes; and determining a phase difference in the tubes in order to determine a mass flow of the test media.

In one embodiment, the method further comprises providing the position of the at least two points to a comparer module operably connected to the at least two sensors on each of the tubes wherein the comparer module uses the phase difference to determine the mass flow of the test media. Inducing vibration in the two tubes further comprises vibrating the tubes with two matching exciters. Vibrating the tubes with two matching exciters further comprises vibrating the at least two tubes at a natural frequency of the tubes when the test media is not present in the tubes.

In another embodiment, the method further comprises rigidly holding the at least two tubes with a housing. The method also comprises determining a temperature of the test media in the at least two tubes with at least two temperature sensors. The method can also comprise inserting the at least two tubes in-line in a system of tubes transporting the test media; allowing fluid from the system of tubes to enter the at least two tubes at an inlet; and allowing fluid to exit the at least two tubes to flow back into the system of tubes at an outlet.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art, which are also intended to be encompassed by the following claims.

What is claimed is:

1. A measuring system comprising:
    two tubes for transporting a material;
    two exciters wherein one of said two exciters is fixedly attached on each of said two tubes configured to induce a vibration in said two tubes;
    at least two sensors on each of said tubes; and
    a test media flowing through said two tubes, wherein a phase difference in said tubes is indicative of a mass flow of said test media.

2. The measuring system of claim 1 further comprising a comparer module operably connected to said at least two sensors on each of said tubes for determining a phase difference of said vibrations in said tubes and determining a mass flow according to said phase difference.

3. The measuring system of claim 1 wherein said two exciters further comprise at least two e-shaped electromagnets configured to induce vibration of said at least two tubes.

4. The measuring system of claim 1 wherein said two exciters are configured to induce vibration of said at least two tubes at a natural frequency of said tubes when said test media is not present in said tubes.

5. The measuring system of claim 1 further comprising a housing configured to rigidly hold said at least two tubes.

6. The measuring system of claim 1 further comprising at least two temperature sensors configured to take a temperature of said test media flowing through each of said tubes.

7. The measuring system of claim 1 further comprising:
    an inlet allowing said test media from an environment to flow into said at least two tubes; and
    an outlet allowing said test media inside said at least two tubes to flow back into an environment.

8. An apparatus comprising:
    two tubes for transporting a material;
    two exciters wherein one of said two exciters is fixedly attached on each of said two tubes configured to induce a vibration in said two tubes;
    at least two sensors on each of said tubes;
    a test media flowing through said two tubes, wherein a phase difference in said tubes is indicative of a mass flow of said test media; and
    a comparer module operably connected to said at least two sensors on each of said tubes for determining a phase difference of said vibrations in said tubes and determining a mass flow according to said phase difference.

9. The apparatus of claim 8 wherein said two exciters further comprise at least two e-shaped electromagnets configured to induce vibration of said at least two tubes.

10. The apparatus of claim 9 wherein said two exciters are configured to induce vibration of said at least two tubes at a natural frequency of said tubes when said test media is not present in said tubes.

11. The apparatus of claim 8 further comprising a housing configured to rigidly hold said at least two tubes.

12. The apparatus of claim 8 further comprising at least two temperature sensors configured to take a temperature of said test media flowing through each of said tubes.

13. The apparatus of claim 8 further comprising:
an inlet allowing said test media from an environment to flow into said at least two tubes; and
an outlet allowing test media inside said at least two tubes to flow back into an environment.

14. A method for measuring mass flow comprising:
inducing vibration in two tubes configured to transport a material;
determining a position of at least two points on each of said at least two tubes with at least two sensors on each of said tubes;
introducing a test media in said two tubes; and
determining a phase difference in said tubes in order to determine a mass flow of said test media.

15. The method of claim 14 further comprising
providing said position of said at least two points to a comparer module operably connected to said at least two sensors on each or said tubes wherein said comparer module uses said phase difference to determine said mass flow of said test media.

16. The method of claim 14 wherein inducing vibration in said two tubes further comprises vibrating said tubes with two matching e-shaped exciters.

17. The method of claim 16 wherein vibrating said tubes with two matching exciters further comprises vibrating said at least two tubes at a natural frequency of said tubes when said test media is not present in said tubes.

18. The method of claim 14 further comprising rigidly holding said at least two tubes with a housing.

19. The method of claim 14 further comprising determining a temperature of said test media in said at least two tubes with at least two temperature sensors.

20. The method of claim 14 further comprising:
inserting said at least two tubes in-line in a system of tubes transporting said test media;
allowing said test media from said system of tubes to enter said at least two tubes at an inlet; and
allowing said test media to exit said at least two tubes to flow back into said system of tubes at an outlet.

* * * * *